United States Patent Office 3,388,227
Patented June 11, 1968

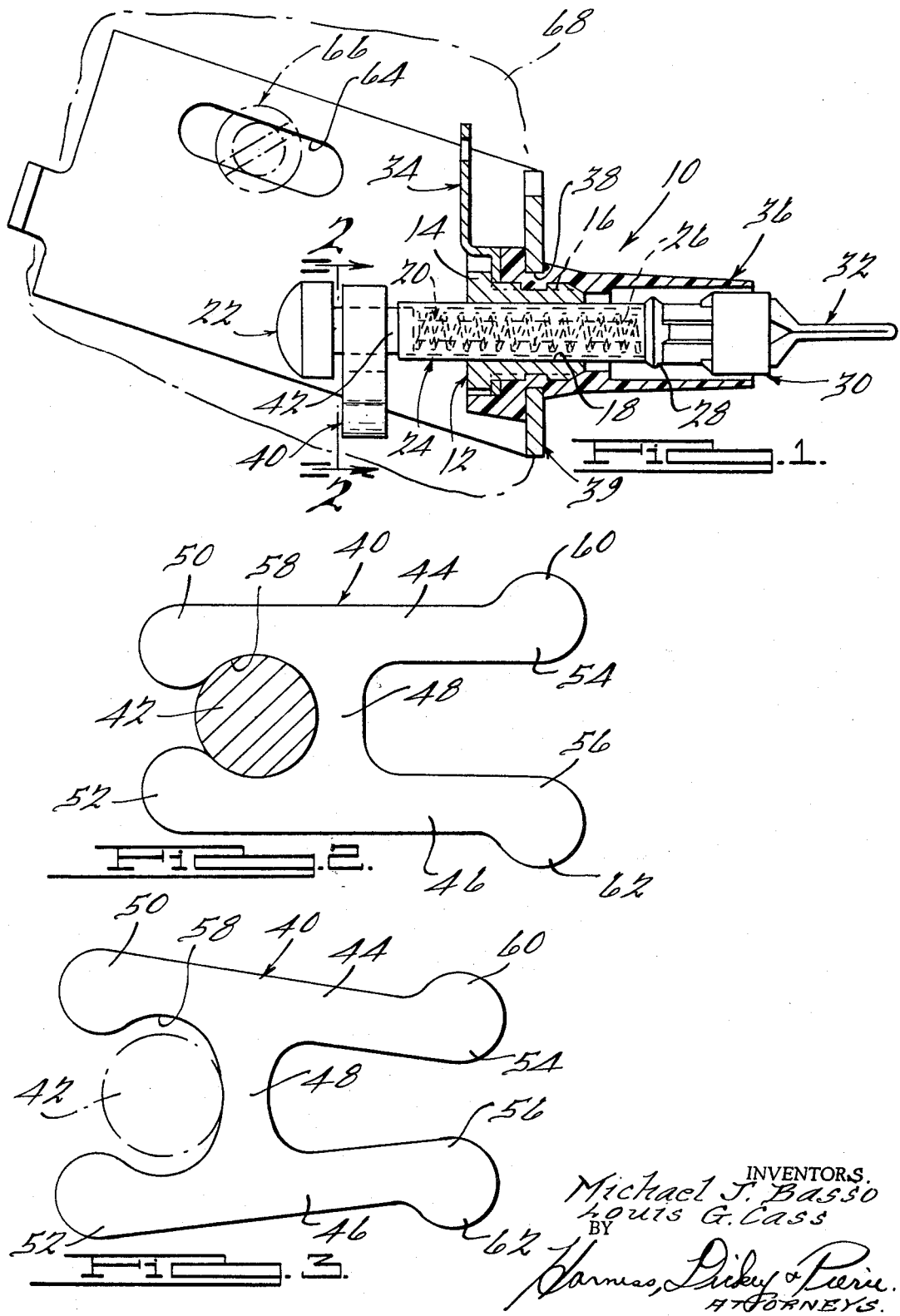

3,388,227
REMOVABLE SPACER MEMBER FOR INSTALLING PUSHBUTTON SWITCH ASSEMBLIES
Michael J. Basso, 7642 Woodward Ave. 48202, and Louis G. Cass, 8900 E. Jefferson 48214, both of Detroit, Mich.
Filed June 5, 1967, Ser. No. 643,596
4 Claims. (Cl. 200—159)

ABSTRACT OF THE DISCLOSURE

A removable spacer member having "clamps and grips" is disclosed to provide installation of an adjustable pushbutton switch assembly.

---

This invention relates generally to electric switches of the type having an adjustable mounting feature. More particularly, this invention relates to improvements in electric switches of the type disclosed in the applicant's Patent No. 2,921,155, issued Jan. 12, 1960, and pending application, Ser. No. 479,176, filed Aug. 12, 1965.

Electric switches of the type shown in the above mentioned patent and application are particularly adapted for use in an environment wherein a first member is movable relative to a second substantially fixed member to effect actuation of the switch which may be mounted on either of the two members. More particularly, such switches are adapted for use with movable members such as are found in automotive vehicles, namely, doors, front and rear deck lids, and brake pedals, wherein the switches operate lighting or other electrical circuits in response to preselected movement of the movable members. One particularly troublesome problem in installing switch assemblies of the above character in automotive vehicles that are assembled under mass production conditions is the irregular clearance that exists between the various movable members and their respective immovable supporting sections or frame members of the vehicles, the clearance between any two of the members and their respective support means usually being appreciably different under normal mass production assembly conditions.

Although the switch assemblies disclosed in the above patent and pending application have made it possible, through the provision of a novel adjustable feature, to provide a switch which is adaptable for mounting where various amounts of clearance exists, for example, between doors and their associated frames, one problem has persisted in utilizing such switches for use wherein an electric circuit must be completed precisely during the entire time the movable member traverses a predetermined path. By way of example, this problem exists in brake pedal applications of the aforesaid type switches wherein the brake light circuit of a vehicle must be energized during the entire time the brake pedal is depressed, i.e., no "free" travel of the brake pedal before the switch is actuated. In order to overcome this problem, it has heretofore been necessary, when mounting such switches, for the installer to place some type of "shim" or spacer means behind the switch actuating button to limit longitudinal movement thereof; simultaneously, the installer must move the switch toward the actuating portion of the brake pedal while permitting the actuating plunger of the switch to be depressed a sufficient amount to prevent any "free" travel of the pedal, the amount of movement of the switch plunger being determined by the size of the shim or spacer, finally, the installer must fixedly mount the switch by means of suitable screws, bolts or the like after the switch is properly positioned. The difficulty of such mounting techniques and in particular, the difficulty in manipulating the spacing shims, has resulted in many installers not using the required shims and merely "eye-balling" the position of the switches prior to mounting the same, resulting in a great number of the switches being improperly mounted, with the further result that the brake light circuits have frequently not been properly energized upon depression of the associated brake pedals or alternatively, have been continuously energized regardless of whether or not the brake pedals were depressed.

The present invention is adapted to overcome the above described problems through the provision of a novel spacer means which is designed to be detachably secured directly to the switch assembly, whereby to obviate the need for the installer to manually handle or manipulate any type of shim or equivalent spacer means as the switch is being mounted. After the switch is operatively mounted, the spacer means of the present invention is adapted to be easily detached from the switch and discarded.

It is accordingly a primary object of the present invention to provide a new and improved means for properly positioning the actuating portion of a switch of the above described character to facilitate operative mounting thereof.

It is another object of the present invention to provide a new and improved spacer means of the above character which may be easily detached after the associted switch is operatively mounted.

It is still another object of the present invention to provide a new and improved spacer means of the above character which is of a relatively simple design, is easy to assemble and economical to commercially manufacture.

It is a further object of the present invention to provide a new and improved spacer means which may be utilized on various types of switch assemblies and which is therefore characterized by universality of application.

It is yet another object of the present invention to provide a new and improved spacer means of the above character that is positive in action to limit longitudinal movement of the actuating portion of the associated switch, thereby providing for accurate installation of the switch.

Other objects and advantages of the present invention will become apparent from the following detailed description, taken in conjunction with the accompanying drawing, wherein:

FIGURE 1 is a longitudinal cross-sectional view of a switch assembly having the new and improved spacer means of the present invention in operative association therewith.

FIGURE 2 is a transverse cross-sectional view, as taken substantially along the line 2—2 of FIGURE 1, and FIGURE 3 is a view similar to FIGURE 2, and shows the position which the spacer means may be biased to facilitate detaching the same from an associated switch assembly.

Referring now to the drawing, an adjustable switch assembly 10 is shown as comprising a body member 12 which is formed with an enlarged head section 14 at the left end thereof and with a plurality of serrations 16 around the right end thereof. The body member 12 defines a central longitudinally extending bore 18 within which an elongated plunger member 20 is disposed, the member 20 having an enlarged diameter head or button member 22 mounted on the left end thereof. The plunger member 20 is supported for reciprocal movement within the body member 12 by means of a thin-walled support tube 24 which is frictionally engaged with the periphery of the bore 18, whereby the tube 24 is longitudinally movable with respect to the body member 12. A suitable helical return spring 26 extends coaxially within the tube 24 around the periphery of the plunger 20, the spring 26 abutting against the button member 22 at one end thereof and at the opposite end against an inwardly deformed terminal section 28 formed on the right end of the tube 24. A terminal mounting block 30 having a terminal 32 is secured to the right end of the plunger 20, the terminal 32 being engageable with the section 28 of the tube 24 to complete an electric circuit between the terminal 32 and another terminal 34 located at the left end of the switch assembly 10. The body member 12, tube 24, plunger 20 and mounting block 30 are disposed substantially within a hollow elongated housing 36 which is preferably tapered so as to be adapted to be press fitted within a suitable opening 38 of a switch mounting bracket 39.

In use, the bracket 38 is mounted such that the switch assembly 10 is positioned adjacent a switch-engaging and actuating member, for example, an actuating portion of a vehicle brake pedal or the like, suitable conductors (not shown) being connected to the terminals 32 and 34 such that the switch assembly 10 is connected with the brake light circuit. When the associated brake pedal is depressed for the first time, thereby moving the plunger member 20 longitudinally of the body member 12, the right side of the button member 22 engages the left end of the tube 24, resulting in the tube 24 being adjusted axially of the body member 12 and housing 35 until the left end of the plunger member 20 is disposed at a preselected position relative to the aforesaid brake pedal. As the plunger member 20 is thus depressed and during each time the brake pedal is thereafter depressed, the left end of the terminal 32 is biased out of engagement with the terminal section 28 of the tube 24, thereby opening the circuit controlled by the switch assembly 10. Upon releasing the vehicle brake pedal, the plunger member 20 will move toward the left end of the support tube 24 under the influence of the return spring 26, thus resiliently engaging the terminal member 32 with the terminal section 28 of the support tube 24 to close the aforesaid circuit.

It will be noted that the above described switch assembly 10 is incorporated herein merely by reference as a descriptive portion of the subject application and that the specific construction of the assembly 10 per se does not constitute a material part of the present invention and therefore will not be described in any further detail, a considerably more detailed description of the construction or operation thereof being disclosed in the applicant's Patent No. 2,921,155 issued Jan. 12, 1960, and in the applicant's pending application, Ser. No. 479,176 filed Aug. 12, 1965.

In accordance with the principles of the present invention, a spacer member, generally desigfinated 40, is adapted to be detachably mounted on a generally cylindrical shank portion 42 of the button member 22 to limit longitudinal movement of the plunger member 20 during operative mounting the switch assembly 10. As best seen in FIGURES 2 and 3, the spacer member 40 comprises a pair of spaced substantially parallel leg sections 44 and 46 which are interconnected by means of an intermediate or medial section 48 that extends between and is integrally formed with the leg sections 44 and 46. The leg sections 44 and 46 comprise clamping portions 50 and 52, respectively, and manual gripping portions 54 and 56, respectively, the portions 50, 52, 54 and 56 being arranged on the opposite sides of the medial section 48. The clamping portions 50 and 52, together with the adjacent side of the medial section 48, define substantially circular clamping surface 58 which is adapted to peripherally engage the shank portion 42 of the member 22 when the spacer member 40 is attached to the switch assembly 10. The manual gripping portions 54 and 56 are formed with outwardly extending ears 60 and 62 which facilitate manual engagement thereof for purposes hereinafter to be described.

The spacer member 40 is preferably fabricated of a somewhat flexible deformable material such as Delron, nylon or hard rubber, whereby the gripping portions 54 and 56 of the leg sections 44 and 46, respectively, may be "squeezed" or similarly biased from the position illustrated in FIGURE 2 to the position shown in FIGURE 3, thereby permitting the spacer member 42 to be easily attached and detached from the shank portion 42 of the button member 22.

In operation, the spacer member 40 is mounted on the switch assembly 10 in the manner illustrated in FIGURE 1 prior to said assembly 10 being installed, for example, adjacent the switch actuating portion (not shown) of an associated automotive vehicle brake pedal. It will be seen that the mounting bracket 39 is formed with an elongated opening 64 through which a suitable mounting screw, bolt or the like 66 extends, the screw 66 functioning to operatively secure the bracket 39 to a fixed portion 68 of the vehicle adjacent the brake pedal. After the screw 66 is inserted through the opening 64, the bracket 39 and switch assembly 10 can be moved toward the left in FIGURE 1, with the result that the plunger member 20 will be depressed a predetermined amount as it engages the switch actuating portion of the brake pedal. The amount which the plunger member 20 is depressed will be limited by the spacer member 40, due to the fact that longitudinal movement of the plunger member 20 will be precluded at such time as the spacer member 40 is compressed between the right side of the button member 22 and the left end of the tube 24. Accordingly, the bracket 39 and switch assembly 10 are moved toward the left in FIGURE 1 until the spacer member 40 is compressed between the member 22 and the tube 24. The thickness of the spacer member 40 is selected such that there will be no "free" travel of the brake pedal prior to actuation of the switch assembly 10 and it will be apparent that the member 40 may be made of different thicknesses to accommodate various types of installations and switch constructions. After the bracket 39 and switch assembly 10 have been properly positioned, the screw 66 may be tightened to fixedly secure the bracket 39 in its proper operative position. Thereafter, the spacer member 40 can be easily removed from the shank portion 42 of the button member 22 by merely squeezing the portions 54, 56 thereof.

It will be seen from the foregoing that the present invention provides a novel spacer member 40 which may be easily mounted and detached from an associated switch assembly, whereby to obviate the need for any extraneous shims or similar difficult to manipulate devices which have heretofore been required to provide the desired spacing upon operative mounting of electrical switches such as the switch assembly 10. Through the provision of the spacer member 40 of the present invention, such switches can be precisely and uniformly oriented during operative mounting thereof with a minimum amount of effort so that the intended operative characteristics of the switches will be achieved.

While it will be apparent that the examplary embodiment illustrated herein is well calculated to fulfill the objects above stated, it will be appreciated that the present invention is susceptible to modification, variation and change without departing from the proper scope or fair meaning of the subjoined claims.

We claim:

1. In a switch assembly comprising a plunger member having an actuating head portion, means supporting the plunger member for longitudinal sliding movement, and means for operatively mounting the assembly adjacent an actuating member engageable with the plunger member, the improvement comprising,
    spacer means detachably secured to the plunger member interjacent the head portion thereof and the adjacent portion of the support means,
    said spacer means, upon movement of the switch assembly toward the actuating member, being adapted to limit longitudinal movement of the plunger member with respect to the support member and thereby space the head portion of the plunger member a predetermined distance from said adjacent portion of the support means.

2. The invention as set forth in claim 1 wherein said spacer means comprises a first portion clampingly engageable with the plunger member and a second portion adapted to be manually engaged to facilitate detaching said spacer means from the switch assembly.

3. The invention as set forth in claim 1 wherein said spacer means is fabricated of a flexible deformable material.

4. The invention as set forth in claim 1 wherein said spacer means comprises a pair of spaced substantially parallel leg sections interconnected by an intermediate section extending between and integrally formed with said leg sections, said leg sections comprising clamping portions which define a clamping surface of substantially complementary shape with respect to and clampingly engaged with the plunger member, said leg sections further comprising manual gripping portions adapted to be manually engaged to facilitate detaching said spacer means from the plunger member.

References Cited

UNITED STATES PATENTS 2,025,848   12/1935   Collis _____ 85—51

FOREIGN PATENTS 688,260   3/1953   Great Britain.

ROBERT K. SCHAEFER, *Primary Examiner.*

H. BURKS, *Assistant Examiner.*